United States Patent

[11] 3,593,301

[72] Inventor Charles E. Newcomb
Woodstock, N.Y.
[21] Appl. No. 697,741
[22] Filed Jan. 15, 1968
[45] Patented July 13, 1971
[73] Assignee International Business Machines Corporation
Armonk, N.Y.

[54] DELAY LINE SYNCHRONIZING SYSTEM

3 Claims, 1 Drawing Fig.

[52] U.S. Cl. .......... 340/172.5
[51] Int. Cl. .......... G06f 13/02
[50] Field of Search .......... 340/172.5, 173 MS, 174 EB; 235/157; 333/29

[56] References Cited

UNITED STATES PATENTS

| | | | |
|---|---|---|---|
| 3,077,581 | 2/1963 | Grady | 340/173 |
| 3,165,721 | 1/1965 | Kennedy et al. | 340/173 |
| 3,465,301 | 9/1969 | Osborn | 340/172.5 |
| 3,289,171 | 11/1966 | Scherr et al. | 340/172.5 |
| 3,328,772 | 6/1967 | Oeters | 340/172.5 |
| 3,351,917 | 11/1967 | Shimabukuro | 340/172.5 |
| 3,432,816 | 3/1969 | Hutchinson et al. | 340/172.5 X |

*Primary Examiner*—Paul J. Henon
*Assistant Examiner*—Harvey E. Springborn
*Attorneys*—Hanifin and Jancin and Joseph J. Connerton

ABSTRACT: In a pulse reiterating system including a delay line storage device, a system is provided for accommodating changes in delay line characteristics resulting from temperature variation or variations in clock frequency, or other system considerations. A synchronizing signal is stored in the delay line and used to control a start/stop oscillator which in turn is used to synchronize the read-in of data to the delay line. When all the data has been read from the delay line, a control pulse from a counter stops the oscillator until it is restarted for the next recirculation loop by the synchronizing signal. Since the oscillator is used to reclock the information during each recirculation loop, any variation in the length of the delay line or frequency of the oscillator is automatically compensated for.

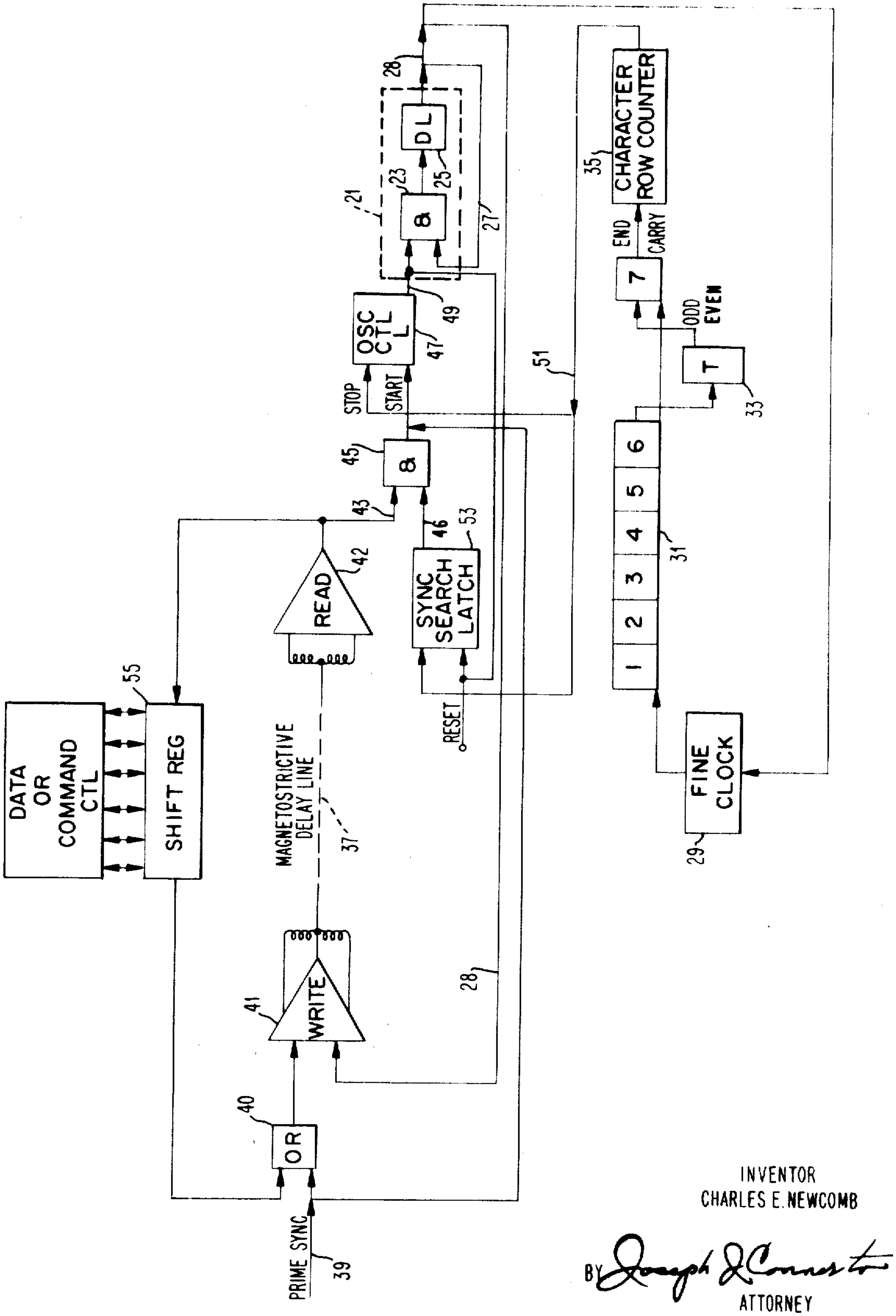
INVENTOR
CHARLES E. NEWCOMB
BY Joseph J. Connerton
ATTORNEY

DELAY LINE SYNCHRONIZING SYSTEM

BACKGROUND OF THE INVENTION

In data processing related applications requiring high storage capacity in which immediate access to data is not required such as in buffered display systems or data transmission systems, delay line storage represents one of the preferred storage devices for providing large capacity storage at moderate cost. While offering economic advantages over other storage devices, a significant problem in delay line storage is long term drift resulting from variation in delay line temperature during operation. Such drift effects the length of the delay line and the stored information, due to cumulative tolerance, may change its position with respect to time. The clock oscillator frequency comparison used for data readout is also directly related to the length of the delay line such that any change in oscillator frequency will provide cumulative pulse dispersion or signal distortion. The prior art solutions to this problem include thermostatically controlled ovens in which the delay lines are mounted and maintained at a uniform temperature. While this tends to limit the delay line drift by maintaining temperature conditions, this solution poses problems including warm-up time of the ovens, excessive power consumption and the corresponding cooling problem and transient line surges produced by the thermostatic control of the heating elements.

SUMMARY OF THE INVENTION

Rather than attempting to maintain a constant temperature to limit delay line drift, the present invention permits the delay line length or the oscillator frequency to vary but controls the start and the running time of the oscillator each recirculation loop. A start/stop oscillator is employed which is started each delay line cycle by means of a synchronizing signal stored in the delay line, and stopped by a counter indication after all data has been read out. Thus, the oscillator used to clock the delay line is automatically turned off after the data has been read out from the delay line and restarted by the synchronizing signal prior to the next delay line cycle. By designing the length of the delay line for worst case conditions, i.e., lowest oscillator frequency and shortest delay line length resulting from temperature variations, and reclocking the delay line each cycle, any variation in delay line length or oscillator frequency will have no effect. By means of this method delay line and oscillator tolerances are less rigorous, permitting substantial cost reduction in the system.

Accordingly, a primary object of the present invention is to provide an improved magnetostrictive delay line buffer. Another object of the present invention is to provide a delay line storage system having a start/stop oscillator in which a control signal is utilized to initiate operation of the oscillator and a counter used to stop operation of the oscillator when the count indicates all data has been read out.

BRIEF DESCRIPTION OF THE DRAWING

The foregoing and other objects, features and advantages of the invention will be apparent from the following more particular description of a preferred embodiment of the invention, as illustrated in the accompanying drawing.

The FIGURE illustrates in block logical form a preferred embodiment of the present invention.

DESCRIPTION OF A PREFERRED EMBODIMENT

In the ensuing description, the present invention will be described in a display system environment in which a delay line is employed for storing character codes for subsequent display on a cathode-ray tube by way of illustration. However, the environment is not considered essential to an understanding of the invention, and the description of the environment will be limited to its functional and timing relationships to the instant invention. The present invention will be described in connection with an overall block system diagram with respect to the manner in which the various circuit components and apparatus are interconnected and in resp ct to the general overall operation which is performed by these components and apparatus. Logical components will be shown in block form and labeled to identify the element such as & for logical AND circuit, L for latch. The direction of data flow and control is identified by the direction of arrows in the drawing. Unless otherwise described, positive logic will be assumed, although it will be appreciated that any type of level, pulse or frequency logic may be employed.

Referring now to the drawing, there is illustrated a block diagram of a preferred embodiment of the instant invention. The environmental display system employed with the instant invention contemplates a 15 line, 64 character per line image format, or a 960 character display. Alternatively, one or two displays having a 512 character image format comprising eight rows of 64 characters per row may be serviced by a single delay line. Either environment may be referenced throughout the specification where deemed appropriate. Timing is provided by a start/stop oscillator 21, which in its simplest embodiment comprises a logical AND circuit 23 having its output connected to a 250 nanosecond delay line 25, the output of which in turn is reapplied through conductor 27 as the second input to the AND circuit 23. The logical AND circuit 23 provides the necessary phase inversion at a rate controlled by the delay element 25. Logical AND circuit 23 is a logic circuit which provides a negative output when both inputs are positive, and a positive output under other input conditions. When both inputs are positive, the output from logical AND 23 reverses to the negative state where it remains for 250 nanoseconds and again by reversing the condition on line 27 250 nanoseconds later, the output from logical AND 23 is switched to the positive state. This operation continues as long as the oscillator control latch is set in the start condition. The oscillator output cycle is 500 nanoseconds representing two 250 nanosecond pulses of opposite polarity. By operating as described above, the oscillator provides a 2 megacycle output which comprises the basic timing for the system. The start/stop oscillator output on line 28 drives a fine clock 29, which functions as a frequency divider producing four 250 nanosecond pulses on separate output lines for each two input cycles from the 2 megacycle oscillator. Since only the one of time pulses is used with the present invention, the output from the fine clock is a 250 nanosecond pulse which recurs at a 1 microsecond rate.

In the environmental display system with which the present invention is affiliated, each character is represented by a 6-bit code, and the delay line format stores two characters with an additional bit used for parity, or a 13-bit two character format. Six-stage bit counter 31 in combination with trigger 33 and the seventh stage of the counter comprises a 13-bit counter, the outputs of which are run consecutively one through six and then consecutively one through seven, thus producing a total count of 13. Due to the nature of operation of trigger 35 more fully described hereinafter, the output of the trigger is designated odd-even, the even output after a count of six conditioning the seventh stage of the counter to provide a count of seven (odd) in alternate counter cycles. As indicated in the drawing, the output from counter position 6 during the initial sequence of counter 31 is applied to an odd-even trigger 33 to condition the seventh position of the counter with the even output such that on the second counter sequence, all seven positions will be actuated. Thus, the seven time output of bit counter 31 occurs only once every 13 microseconds, and represents the final bit pulse of the basic character time. The end carry output from the seventh stage of bit counter 31 drives a character-row counter 35, which identifies the location of each character of the environmental display format by line and row. While shown as a single block for purposes of clarity, the character-row counter could comprise a row counter driven by the end carry of a character counter. The character counter of character-row counter 35 is stepped once for each end carry from the 13-stage bit counter, while the end carry from the character counter is generated after a predetermined number of characters, corresponding to the number in a row of the image format to be utilized, have been generated. As pointed out earlier, one example of a character-row counter employs a 15 line 64 character per line image format. The environmental system has a display capability of one character each 13 microseconds. A 9.6 millisecond delay line 37 represents the basic storage element of the present system, and is the means by which character information for the environmental display system is stored and regenerated. While any type of delay device can be used, a magnetostrictive delay line has distinct advantage and represents the preferred device. Such devices, which are well known in the art, effectively convert an electrical pulse into a mechanical stress which will be propagated through the delay line at a known velocity, and the mechanical stress at the other end of the magnetostrictive wire converted into an electrical impulse. Data is stored on the delay line in character time slots of 13 bits (13 microsecond duration). Each time slot contains two bytes of six bits each, followed by a single parity bit. A synchronizing pattern which may comprise one or more synchronizing bits is recorded following the last character time slot, and the character time slot immediately following the thus recorded sync pattern is arbitrarily defined as time slot 1.

Assuming that the delay line 37 is initially cleared of data, a synchronizing pattern is applied through line 39 labeled "-Prime Sync" and logical OR circuit 40, write amplifier 41 to the input of delay line 37. At the same time, the synchronizing pattern is applied to the start input of the oscillator control latch to start the oscillator and counter network. Since the capacity of the delay line must include all the data stored plus the synchronizing pattern and the length the delay line must allow for drift, the synchronizing pattern requires longer to traverse the delay line than the time required to produce an end carry from the character-row counter 35. The end carry from character-row counter 35 on line 51 resets the oscillator control latch 47 to the stop condition, stopping start/stop oscillator 21, while simultaneously setting the sync search latch 53 to condition logical AND circuit 45. When the sync pattern is detected at the output of the delay line 37 by read amplifier 42 and applied to line 43, the resultant output from logical AND circuit 45, previously conditioned by line 46 from sync search latch 53, sets the oscillator control latch to the start condition to start the clock 21. Thus the clock and counter network is restarted in synchronization with the sync pattern and the counter contents identifies the location of the pattern within the delay line. After the restarting of oscillator 21 has been initiated, the sync search latch 53 is reset by the output from oscillator control latch 47, but the oscillator control latch 47 remains latched in the start condition.

Reading data from the delay line is accomplished in the same manner as reading the synchronizing pattern described above. Start/stop oscillator 21 is started at the same time as data is initially applied to the delay line and drives the associated counting network which identifies the location on the display of data readout from the delay line and also identifies when the complete contents of the delay line have been read out. Each complete character cycle of 13 bits produces an end carry to step the character counter 35. When character counter 35 reaches a prescribed count, which in one described environment would be 960 characters, the end carry output 51 from character-row counter 35 resets the oscillator control latch 47, thereby stopping start/stop oscillator 21 by deconditioning logical AND circuit. The same output on line 51 is applied to set the sync search latch 53, reversing its state and conditioning logical AND circuit 45. At this time, all of the data stored in the delay line 37 has been read out.

During normal operation when data in the delay line is displayed, the information or data from the delay line 37 is continuously recirculated through a recirculation loop including 13-bit shift register 55 and logical OR circuit 40. By placing a shift register in the recirculation loop, information from an external source such as a data processor or a keyboard could be applied to the delay line through the shift register from a data or command control system or allow parallel readout of a six-bit data or control word. During readin or readout of data from magnetostrictive delay line 37 in the above described manner, it may be desired to avoid display. Logical AND circuit 45 will be deconditioned by the output 46 when the sync search latch 53 is reset to prevent the display data from setting the oscillator control latch 47. During readout to the display, the oscillator control latch will be set and data read out as previously described. When the data contents from the delay line have been read out, the oscillator is stopped by the end carry from character-row counter 35 until the sync pattern in the delay line is detected, irrespective of the time involved. When the sync pattern is again read out on line 43, logical AND circuit 45, which has been conditioned by the sync search latch 53, will again generate a control pulse to set the oscillator control latch 47 and the start/stop oscillator will be started for the next readout cycle. By operating in this manner, any long term drift of the delay line characteristics is immaterial, since the oscillator is effectively resynchronized each delay line cycle. By thus making the length of the delay line noncritical and permitting greater circuit tolerance, the manufacturing cost of the system and the delay line can be substantially reduced without in any way adversely effecting the operation of the line.

While the above description has been described in a display system environment, it will be obvious that the principles of the invention are applicable to various systems such as data transmission using delay line storage. Likewise, the invention is applicable to a NRZ (Nonreturn Zero) or a RZ (Return Zero) mode of operation. By synchronizing data readin with the start-stop clock each recirculation cycle, synchronization of readout with the clock is not essential.

While the invention has been particularly shown and described with reference to a preferred embodiment thereof, it will be understood by those skilled in the art that various changes in form and details may be made therein without departing from the spirit and scope of the invention.

What I claim is:

1. A self synchronizing delay line recirculation system comprising in combination a magnetostrictive delay line storing data and control signals, said control signals including a synchronizing signal pattern, a source of clock pulses counting said data signals read out from said delay line, counter means responsive to said clock pulses for identifying the end of data readout during each circulation of said delay line, means responsive to said identification means for terminating the generation of said clock pulses each circulation of said delay line, and means responsive to detection of said synchronizing signal pattern for initiating the operation of said source of clock pulses for successive delay line circulation.

2. Apparatus of the type claimed in claim 1 wherein said source of clock pulses comprises a start-stop oscillator.

3. Apparatus of the type claimed in claim 1 wherein said delay line recirculation system includes a shift register for data entry or readout.